UNITED STATES PATENT OFFICE 2,645,592

PEST CONTROL CHEMICALS

Ramsey G. Campbell, Richmond, Calif., assignor to Stauffer Chemical Company, a corporation of California No Drawing. Application March 2, 1950,
Serial No. 147,337

6 Claims. (Cl. 167—30)

This invention relates to the killing of pests.

I have found that compounds having two phenyl groups linked together by a sulfone group and having one of the phenyl groups substituted with fluorine in only the para position and the other phenyl group substituted with chlorine or bromine in only the para position, are effective in killing mites, particularly plant-feeding mites belonging to the family Tetranychadae, in all stages of their development, e. g., eggs and all mature and immature post-embryonic forms. These compounds are 4-chlorophenyl 4' fluorophenyl sulfone and 4-bromophenyl 4' fluorophenyl sulfone. The materials can be used alone or in admixture with one another; they can be made by known methods.

As against mites, these compounds are quite effective. For example, in comparison with O,O-diethyl-O-p-nitrophenyl thiophosphate, parathion, each of these compounds is more effective in controlling various species of mites at the same concentration. Reference has been made to parathion for comparison because it is presently regarded as a very effective miticide and is being used extensively on a commercial scale. These compounds are further unique in that each is effective against mites while closely related compounds are not, such as the corresponding bis(4-chlorophenyl) sulfone, bis(4-bromophenyl) sulfone, bis(4-fluorophenyl) sulfone and 4 chlorophenyl 4' bromophenyl sulfone.

These compounds of this invention can be applied in any desired manner, as an aqueous spray, as an aerosol, as a dust, mixed with a suitable powder, or in solution in a solvent. When applied in an aqueous spray, the compound should be present in a concentration of from 0.01% to 1.0%; usually about 0.05% to 0.25% by weight suffices, but more can be employed if desired. When applied as a dust, the compound should be present in a concentration of 1% to 50% and more by weight in a suitable inert carrier, usually about 5%. The compounds are solids at ordinary temperatures and are not difficult to compound; one can employ them in any of the dry or wet carrier compositions utilized heretofore and which are well-known. The compounds can also be applied as a dust, being mixed with any of the usual powder carriers; a dust adhesive may be included. In this instance, the concentration of the compound can vary over fairly wide limits, as between 1% and 50%. The compounds can also be applied as a liquid dispersed in water and one can make up a liquid concentrate by dissolving the compound in a suitable solvent and adding a wetting agent. Generally it is desirable that the concentration of the compound be as high as its solubility in a given solvent will permit. A typical composition includes 20% by weight of the compound, a suitable wetting agent, 10% of acetone and the balance xylene or an equivalent solvent such as a petroleum fraction known as Socal 3. In case the compound is soluble only to a limited extent in one of the less expensive solvents, it is desirable to add a small amount of a mutual solubilizing agent such as acetone.

To show the utility of these compounds, potted pinto bean plants, heavily infested with all stages of the two-spotted mite, Tetranychus bimaculatus (Harvey) were sprayed in groups of two with various aqueous spray compositions containing the compound to be tested; the compositions were identical, a concentration of each compound of 0.06% being employed; a water suspension was made up by adding 0.015% Aerosol OT (di-octyl sodium sulfosuccinate) and 0.005% Methocell (viscosity 25 cps.) to tap water with sufficient of the toxicant preferably in a dilute acetone solution (2½%–5%), to provide a 0.06% suspension. On all the plants sprayed with the compounds of this invention, there was a 100% kill of eggs and all post-embryonic forms, while the plants remained free of mites for fourteen days thereafter, at which time the experiment was terminated. A parathion spray composition of like concentration caused a 100% mortality of all post-embryonic forms, but only 90% of the eggs. The mite population on these plants had increased appreciably by the time the experiment was terminated because of the incomplete ovicidal action of the parathion. On the unsprayed control plants, the mite infestation increased rapidly and, at the termination of the experiment after fourteen days, their leaves had been destroyed by the excessive injury caused by the mites.

As illustrative of further useful compositions, the following are set forth:

50 pounds of each of the compounds were dispersed on 49.5 pounds of Attaclay, a finely divided clay, together with a half-pound of Duponal 51, a higher aliphatic alcohol sulfate wetting agent. The final composition provided a dry powder which, when placed with water, wetted readily; the composition was sprayed on a mite habitat. Such compositions are usually applied at the rate of about 2 pounds per 100 gallons of water, although this can be varied between about one-half pound and four pounds per 100 gallons. In place of Attaclay, one can use any other suitable inert finely divided carrier such as pyrophyllite, diatomaceous earth, bentonite, volcanic ash, talc, lignocellulosic flour, sulfur, and mixtures of these. The concentration of the compound in the finished product can vary; generally it is desirable to utilize as much of the effective compound as is feasible and economical and the concentration of the compound can be increased to the order of 90% and up to 98%.

The toxicant can also be applied as a dust, being mixed with any of the aforementioned carriers. In this instance, the concentration of the compound can vary over fairly wide limits, as between 1% and 50%.

The toxicant can also be applied as a liquid dispersed in water and one can make up a liquid concentrate by dissolving the compound in a suitable solvent and adding a wetting agent. Generally it is desirable that the concentration of the compound be as high as its solubility in a given solvent will permit. A typical composition includes 20% by weight of each of the compounds, a suitable wetting agent, 10% of acetone and the balance xylene or an equivalent solvent such as a petroleum fraction known as Socal 3. In case the compound is soluble only to a limited extent in one of the less expensive solvents, it is desirable to add a small amount of a mutual solubilizing agent such as acetone.

I claim:

1. An acaracide comprising an inert insecticidal adjuvont as a carrier and an effective concentration of a material selected from the group consisting of 4-chlorophenyl 4′ fluorophenyl sulfone and 4-bromophenyl 4′ fluorophenyl sulfone.

2. An acaracide comprising an aqueous emulsion and an effective concentration of a material selected from the group consisting of 4-chloropheny 4′ fluorophenyl sulfone and 4-bromophenyl 4′ fluorophenyl sulfone.

3. An acaracide comprising a powder carrier and an effective concentration of a material selected from the group consisting of 4-chlorophenyl 4′ fluorophenyl sulfone and 4-bromophenyl 4′ fluorophenyl sulfone in the form of powder.

4. A method of controlling mites comprising applying to growing plants a composition comprising an inert insecticidal adjuvont as a carrier and an effective concentration of a material selected from the group consisting of 4-chlorophenyl 4′ fluorophenyl sulfone and 4-bromophenyl 4′ fluorophenyl sulfone.

5. A method of controlling mites comprising applying to growing plants a composition comprising an aqueous emulsion containing an effective concentration of a material selected from the group consisting of 4-chlorophenyl 4′ fluorophenyl sulfone and 4-bromophenyl 4′ fluorophenyl sulfone.

6. A method of controlling mites comprising applying to growing plants a composition comprising a powder carrier and an effective concentration of a material selected from the group consisting of 4-chlorophenyl 4′ fluorophenyl sulfone and 4-bromophenyl 4′ fluorophenyl sulfone in the form of powder.

RAMSEY G. CAMPBELL.

References Cited in the file of this patent

UNITED STATES PATENTS

| Number | Name | Date |
|---|---|---|
| 2,148,928 | de Meuron | Feb. 28, 1939 |
| 2,538,513 | Kenaga | Jan. 16, 1951 |

OTHER REFERENCES

Lauger et al., Helvetica Chimica Acta, volume XXVII, Fasciculus Quartus, June 15, 1944, page 904.

Bradlow et al., Journal American Chemical Soc., volume 70, pages 654–7 (1948).